(12) United States Patent
Fisher (10) Patent No.: US 8,233,095 B2
(45) Date of Patent: Jul. 31, 2012

(54) CHANNEL SCAN FOR TERRESTRIAL BROADCAST DIGITAL TELEVISION RECEIVER

(75) Inventor: Jeffrey P. Fisher, Dublin, CA (US)

(73) Assignee: Broadcom Corporation, Irvine, CA (US)

(*) Notice: Subject to any disclaimer, the term of this patent is extended or adjusted under 35 U.S.C. 154(b) by 1252 days.

(21) Appl. No.: 11/739,726

(22) Filed: Apr. 25, 2007

(65) Prior Publication Data

US 2008/0266465 A1    Oct. 30, 2008

(51) Int. Cl.
*H04N 5/50* (2006.01)
*H04N 7/00* (2006.01)
*H04N 11/00* (2006.01)
*H04B 3/36* (2006.01)

(52) U.S. Cl. ........ 348/731; 348/732; 348/460; 348/464; 455/7

(58) Field of Classification Search ................ None
See application file for complete search history.

(56) References Cited

U.S. PATENT DOCUMENTS

| 5,805,230 | A  | * | 9/1998 | Staron | 348/460 |
| 6,477,354 | B1 | * | 11/2002 | Roberts et al. | 455/7 |
| 7,564,503 | B2 | * | 7/2009 | Onomatsu | 348/732 |
| 2003/0156063 | A1 | * | 8/2003 | Spilker et al. | 342/464 |
| 2006/0085820 | A1 |   | 4/2006 | Barron et al. | |
| 2006/0112412 | A1 |   | 5/2006 | Park | |
| 2006/0209217 | A1 | * | 9/2006 | Onomatsu et al. | 348/732 |

OTHER PUBLICATIONS

ATSC Standard: Program and System Information Protocol for Terrestrial Broadcast and Cable (Revision C) With Amendment No. 1 (A/65C), Advanced Television Systems Committee, Washington D.C., Jan. 2, 2006, Amendment No. 1, (May 9, 2006), 155 pages.
EIA Standard: Line 21 Data Services (EIA/CEA-608-B), Electronic Industries Alliance, Arlington VA, (Oct. 2000), 154 pages.

* cited by examiner

*Primary Examiner* — Jefferey Harold
*Assistant Examiner* — Sean Haiem
(74) *Attorney, Agent, or Firm* — Fiala & Weaver P.L.L.C.

(57) ABSTRACT

A technique that allows a DTV receiver to perform a channel scan in a manner that is faster and more efficient than conventional channel scanning techniques. In accordance with one embodiment of the present invention, the technique allows a DTV receiver to perform a scan of only those channels that are known to be available within a local terrestrial broadcast region. In accordance with another embodiment of the present invention, the technique allows a DTV receiver that operates in conjunction with an antenna, such as a smart antenna designed to comply with EIA/CEA 909, to use the same antenna configuration parameters for different terrestrial broadcast signals in an instance where such signals are known to originate from the same antenna location.

20 Claims, 9 Drawing Sheets

| TSID #1 | CHANNEL NUMBER | LOCATION CODE |
|---|---|---|
| TSID #2 | CHANNEL NUMBER | LOCATION CODE |
| TSID #3 | CHANNEL NUMBER | LOCATION CODE |
| TSID #4 | CHANNEL NUMBER | LOCATION CODE |
| TSID #5 | CHANNEL NUMBER | LOCATION CODE |
| TSID #6 | CHANNEL NUMBER | LOCATION CODE |
| ○ ○ ○ | ○ ○ ○ | ○ ○ ○ |
| TSID #N | CHANNEL NUMBER | LOCATION CODE |

| TSID #1 | CHANNEL NUMBER | LOCATION CODE | ANTENNA LOCATION CODE |
|---|---|---|---|
| TSID #2 | CHANNEL NUMBER | LOCATION CODE | ANTENNA LOCATION CODE |
| TSID #3 | CHANNEL NUMBER | LOCATION CODE | ANTENNA LOCATION CODE |
| TSID #4 | CHANNEL NUMBER | LOCATION CODE | ANTENNA LOCATION CODE |
| TSID #5 | CHANNEL NUMBER | LOCATION CODE | ANTENNA LOCATION CODE |
| TSID #6 | CHANNEL NUMBER | LOCATION CODE | ANTENNA LOCATION CODE |
| o o o | o o o | o o o | o o o |
| TSID #N | CHANNEL NUMBER | LOCATION CODE | ANTENNA LOCATION CODE |

CHANNEL SCAN FOR TERRESTRIAL BROADCAST DIGITAL TELEVISION RECEIVER

BACKGROUND OF THE INVENTION

1. Field of the Invention

The invention generally relates to digital television. More specifically, the invention is related to systems and devices that receive terrestrial (over-the-air) broadcast of digital television signals.

2. Background

For a variety of reasons, it may be difficult for a digital television (DTV) receiver to acquire a useable DTV signal over the air. One reason for this is multipath distortion of the broadcast signal that occurs in areas with many obstructions, such as urban areas with numerous buildings. In analog televisions, poor reception of a broadcast signal results in a degraded, but nevertheless viewable, picture. In contrast, when a DTV experiences poor reception of the broadcast signal, the result is no picture whatsoever for the end user. In this sense, DTV signal reception presents an "all or nothing at all" proposition.

In the United States, analog television broadcasts are scheduled to end by Feb. 17, 2009. It is nevertheless anticipated that there will still be a large population of television viewers relying on terrestrial broadcasting for TV viewing at that time. This population will include owners of older analog televisions, who will be required to obtain a special analog-to-digital conversion box to receive DTV broadcast signals when analog broadcasts are turned off. For members of this population, an inability to adequately receive DTV broadcast signals will mean the inability to view any television whatsoever.

In view of this, many DTV receivers are being implemented to work with so-called "smart antennas" that are intended to optimize reception of DTV signals. Smart antennas have been designed to comply with the Consumer Electronics Association (CEA) Antenna Control Interface Standard (EIA/CEA-909), which provides a standard physical interface and control protocol by which a DTV receiver can automatically adjust antenna operating parameters. Such operating parameters include, for example, electronic or mechanical steering of antenna directivity, preamplifier gain, and antenna polarization. Consumers can use smart antennas to simplify their off-air DTV experience by eliminating the need to manually adjust the antenna to receive a clear picture.

During setup of a DTV, the DTV receiver will need to perform a channel scan of all 68 radio frequency (RF) channels (channels 2-69) to try to lock on a usable signal for each channel. This process can take quite a long time and thus create frustration for consumers first setting up their DTVs.

In a DTV system that uses a smart antenna, the setup process can be particularly time-consuming. In such a system, for each channel the setup process involves setting the tuner to the appropriate channel frequency and then sending a series of configuration commands to the smart antenna to try and find an antenna mode that receives, or optimally receives, a broadcast signal. In Mode A operation in accordance with EIA/CEA-909, seven control bits are used to control antenna operation (2 bits for coarse direction or switching control, 2 bits for fine direction control, 1 bit for polarization control and 2 bits for preamplifier gain), corresponding to 128 different possible configuration commands. Thus, a DTV receiver operating in this mode may need to send up to 128 configuration commands to the antenna for each channel.

In a situation where no broadcast signal is available, the DTV receiver will need to cycle through all 128 configuration commands before it recognizes that the scan for that particular channel has failed. In the worst case, a DTV receiver that is not capable of receiving any broadcast channels whatsoever will be required to cycle through all 128 antenna configurations for each of the 68 broadcast channels, resulting in a scan of 8704 different channel/antenna combinations. In a situation where the DTV receiver allows approximately 0.5 seconds for a channel lock to occur, this process can take over an hour to complete. Moreover, this lengthy process will have to be repeated any time the smart antenna is intentionally or unintentionally moved, since the stored antenna configuration parameters for each channel will no longer be valid. Thus, a consumer who accidentally jostles an indoor antenna or has an outdoor antenna that is moved due to a storm or some other event will be forced to perform the lengthy channel scan all over again.

What is needed, then, is a technique that allows a DTV receiver to perform a channel scan in a manner that is faster and more efficient than conventional channel scanning techniques. Ideally, the desired technique should allow the DTV receiver to perform a scan of only those channels that are known to be available within a local terrestrial broadcast region. Additionally, the desired technique should allow a DTV receiver that operates in conjunction with an antenna, such as a smart antenna designed to comply with EIA/CEA 909, to use the same antenna configuration parameters for different terrestrial broadcast signals in an instance where such signals are known to originate from the same antenna location.

BRIEF SUMMARY OF THE INVENTION

The present invention provides a technique that allows a DTV receiver to perform a channel scan in a manner that is faster and more efficient than conventional channel scanning techniques. In accordance with one embodiment of the present invention, the technique allows a DTV receiver to perform a scan of only those channels that are known to be available within a local terrestrial broadcast region. In accordance with another embodiment of the present invention, the technique allows a DTV receiver that operates in conjunction with an antenna, such as a smart antenna designed to comply with EIA/CEA 909, to use the same antenna configuration parameters for different terrestrial broadcast signals in an instance where such signals are known to originate from the same antenna location.

In particular, an embodiment of the present invention is a method for performing a channel scan by a DTV receiver. In accordance with the method, a unique identifier of a terrestrial broadcast signal is obtained, wherein the unique identifier is transmitted as part of the terrestrial broadcast signal. A memory is accessed to identify one or more local radio frequency (RF) channels based on the unique identifier. Then, any RF channel that is not identified as a local RF channel during the accessing step is removed from a series of RF channels that are eligible for channel scanning.

The unique identifier of the terrestrial broadcast signal may be a Transport Stream ID obtained from a Terrestrial Virtual Channel Table or from a Program Association Table associated with the terrestrial broadcast signal or a Transmission Signal ID obtained from an EIA/CEA-608-B data stream embedded within the terrestrial broadcast signal.

Accessing the memory to identify one or more local radio frequency (RF) channels based on the unique identifier may include performing a first memory access to obtain a location code associated with the unique identifier and performing a second memory access to obtain one or more channel numbers associated with the obtained location code, wherein each channel number uniquely identifies a local RF channel.

Performing the second memory access may further include identifying a broadcast antenna location associated with each local RF channel. In accordance with such an embodiment, the method may further includes storing a set of parameters for configuring an antenna connected to the DTV receiver to receive a signal broadcast over a first local RF channel and using the stored set of parameters for configuring the antenna to receive a signal broadcast over a second local RF channel. This is done if the broadcast antenna location associated with the first local RF channel is the same as the broadcast antenna location associated with the second local RF channel.

Another embodiment of the present invention is a DTV receiver. The DTV receiver includes a memory and control logic. The control logic is adapted to obtain a unique identifier of a terrestrial broadcast signal received by the DTV receiver, wherein the unique identifier was transmitted as part of the terrestrial broadcast signal. The control logic is further adapted to access the memory to identify one or more local RF channels based on the unique identifier, and to remove from a series of RF channels that are eligible for channel scanning any RF channel that is not identified as a local RF channel.

The unique identifier of the terrestrial broadcast signal may be a Transport Stream ID obtained from a Terrestrial Virtual Channel Table or from Program Association Table transmitted as part of the terrestrial broadcast signal or a Transmission Signal ID from an EIA/CEA-608-B data stream embedded within the terrestrial broadcast signal.

The control logic may be further adapted to perform a first memory access to obtain a location code associated with the unique identifier and to perform a second memory access to obtain one or more channel numbers associated with the obtained location code, wherein each channel number uniquely identifies a local RF channel.

The control logic may be still further adapted to identify a broadcast antenna location associated with each local RF channel during the second memory access, to store a set of parameters for configuring an antenna connected to the DTV receiver to receive a signal broadcast over a first local RF channel, and to use the stored set of parameters for configuring the antenna connected to the DTV receiver to receive a signal broadcast over a second local RF channel. The control logic does this if the broadcast antenna location associated with the first local RF channel is the same as the broadcast antenna location associated with the second local RF channel.

Yet another embodiment of the present invention is a system for receiving a DTV signal. The system includes a DTV receiver and an antenna communicatively coupled to the DTV receiver. The antenna is adapted to receive a plurality of configuration commands from the DTV receiver, wherein each of the plurality configuration commands causes the antenna to operate in a corresponding one of a plurality of different operating modes. The DTV receiver is adapted to store a configuration command used to control the antenna to receive a signal broadcast over a first radio frequency (RF) channel. The DTV receiver is also further adapted to use the stored configuration command to control the antenna to receive a signal broadcast over a second RF channel. The DTV receiver may be adapted to use the stored configuration command to control the antenna to receive the signal broadcast over the second RF channel when it determines that the signal broadcast over the first RF channel and the signal broadcast over the second RF channel are transmitted from the same antenna location.

Each configuration command may include a parameter for controlling one of antenna direction, antenna polarization, or antenna preamplifier gain. The antenna may be compliant with the Consumer Electronics Association (CEA) Antenna Control Interface Standard (EIA/CEA-909).

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structur-

DETAILED DESCRIPTION OF THE INVENTION

A. Example Operating Environment

Figure 1:
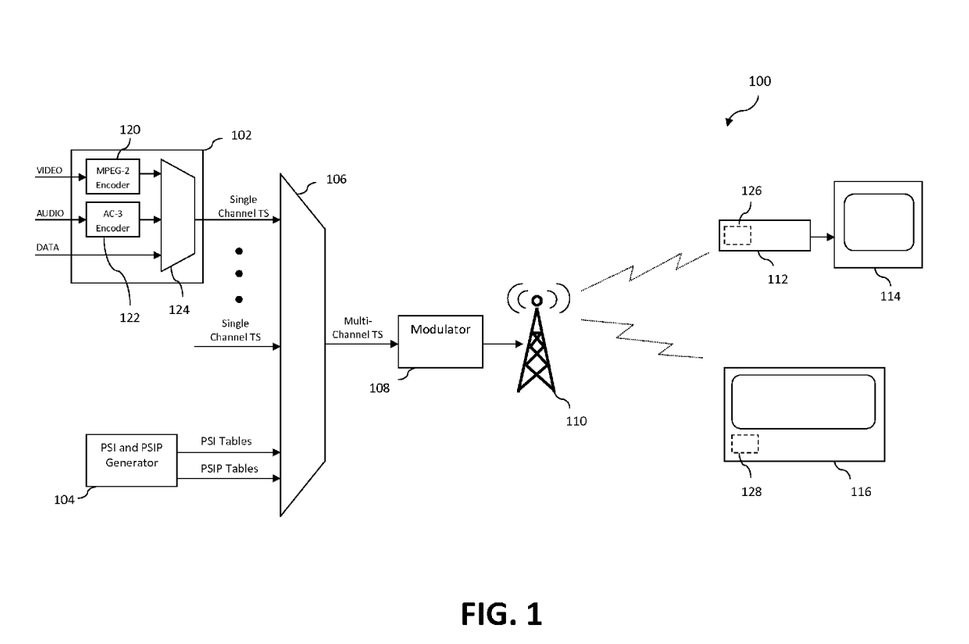
FIG. 1 is a block diagram of an example digital television (DTV) broadcasting system in which an embodiment of the present invention may operate.

FIG. 1 illustrates an operating environment in which an embodiment of the present invention may operate. In particular, FIG. 1 shows a digital television (DTV) broadcasting system 100 in which a television signal is broadcast from a DTV transmitter 110 and is received by a first DTV receiver 126 and a second DTV receiver 128. The broadcast television signal complies with the Advanced Television Systems Committee (ATSC) digital television standard. The ATSC standard has been adopted by the United States, Canada, Mexico, South Korea, and recently Honduras and is also being considered by other countries. In the United States, the ATSC standard is intended to replace the National Television Standards Committee (NTSC) standard for analog television broadcasting, with all NTSC analog broadcasts currently scheduled to end by Feb. 17, 2009.

Persons skilled in the relevant art(s) will readily appreciate that a DTV broadcasting system may include more than one DTV transmitter. Persons skilled in the relevant art(s) will also readily appreciate that a DTV broadcasting system would likely include many more than two DTV receivers in a given broadcast area. Nevertheless, only single DTV transmitter 110 and two DTV receivers 126 and 128 are shown in FIG. 1 for the sake of simplifying the description of DTV broadcasting system 100.

The ATSC-compliant television signal broadcast by DTV transmitter 110 carries multiple digital (or virtual) channels within a single radio frequency (RF) channel. This is achieved by multiplexing multiple single program transport streams into a multi-channel transport stream. In particular, as shown in FIG. 1, a program encoder 102 encodes video data associated with a first program using an MPEG-2 encoder 120, encodes audio data associated with the first program using an AC-3 encoder 122, and multiplexes the encoded video data, the encoded audio data, and auxiliary data associated with the first program using a first multiplexer 124 to generate a first single program transport stream. Additional single program transport streams corresponding to different programs are generated in a like manner using additional program encoders (not shown in FIG. 1).

The single program transport streams are combined by a second multiplexer 106 to generate a multi-program transport stream. As shown in FIG. 1, also inserted into the multi-program transport stream are Program Specific Information (PSI) and Program and System Information Protocol (PSIP) information, which are provided by a PSI and PSIP generator 104.

The PSI information is data that identifies what part of the multi-program transport stream belongs to a particular program. Transmission of the PSI information is required for conformance with the MPEG-2 standard. Since the ATSC standard requires MPEG-2 conformance, insertion of the PSI information is necessary in order for the signal broadcast by transmitter 110 to be ATSC-compliant. At a minimum, the PSI information includes a Program Association Table (PAT) and a Program Map Table (PMT). The PAT is the entry point for the PSI tables. For each assigned program number, the PAT lists the packet id (PID) for packets containing that program's PMT. The PMT lists all the PIDs for packets containing elements of a particular program (audio, video, auxiliary data, and Program Clock Reference (PCR)). The syntax for each table is defined within International Standard ISO/IEC 13818-1. According to the ATSC standards, the PAT must be transmitted at least once every 100 milliseconds (ms) and the PMT must be transmitted once every 400 ms.

The PSIP information includes information about the transmitting station and the programs that are being broadcast. The PSIP information is used by a DTV receiver to identify a DTV station and to determine how to tune to it. The PSIP information may identify both a DTV channel and an associated analog channel. In addition to identifying a channel number, the PSIP information indicates whether multiple program channels are being broadcast and, if so, how to find them. Among other things, it identifies whether the programs are closed-captioned, if data is associated with the program, and also conveys V-chip information. Properly-encoded PSIP data in DTV signals is vital information for receivers to correctly identify and tune to a particular station.

For terrestrial broadcasts, the PSIP information includes a number of tables, including a Terrestrial Virtual Channel Table (TVCT), a Master Guide Table (MGT), a System Time Table (STT), Event Information Tables (EIT), and may include a Rating Region Table (RRT). The TVCT defines, at a minimum, the MPEG-2 programs embedded in the transport stream in which the TVCT is carried. The MGT defines the type, PIDs, and versions for all the other PSIP tables in the transport stream, except for the STT. The STT defines the current date and time of day. The EITs describe hours of events (TV programs) and include all of the virtual channels listed in the TVCT. The RRT defines the TV parental guideline (rating information) system referenced by any content advisory descriptor carried within the transport stream, except for RRTs corresponding to certain areas.

Further information concerning the PSIP information, including the maximum cycle times for transmission of the PSIP tables, may be found in ATSC document A/65C, entitled "Program and System Information Protocol for Terrestrial Broadcast and Cable (Revision C) with Amendment No. 1," the entirety of which is incorporated by reference herein.

With continued reference to FIG. 1, the multi-program transport stream output from second multiplexer 106 is received by a modulator 108, which converts the multi-program transport stream into a form suitable for broadcast. Modulator 108 may be, for example, an 8-vestigital sideband (VSB) modulator. DTV transmitter 110 receives the signal from modulator 108 and transmits it on an assigned frequency.

As shown in FIG. 1, the ATSC-compliant broadcast signal is received by first DTV receiver 126 and second DTV receiver 128. As will be described in more detail herein, each DTV receiver converts the broadcast signal from an analog to digital form, demodulates the converted signal, de-multiplexes the transport streams and PSI/PSIP information embedded within the demodulated signal, and decodes a selected transport stream for display to a user on a television.

First DTV receiver 126 is shown as an integrated part of a device 112 attached to a television 114. Device 112 may comprise a set-top box, digital video recorder (DVR), video cassette recorder (VCR), or other device adapted for outputting video and/or audio data to a television. In one embodiment, device 112 is a digital-to-analog converter box that operates to convert the ATSC-compliant broadcast signal into a format suitable for display on an NTSC-compliant television. In contrast to first DTV receiver 126, second DTV receiver 128 is shown as an integrated part of a television 116. Thus, television 116 may be considered "DTV-ready."

Although DTV receivers 126 and 128 are shown as being integrated within a television or within a device connected to a television, persons skilled in the art will readily appreciate that DTV receivers may also be included in other types of devices as well, such as handheld media devices or audio devices. Thus, the example operating environment depicted in FIG. 1 is not intended to limit the present invention.

Figure 2:
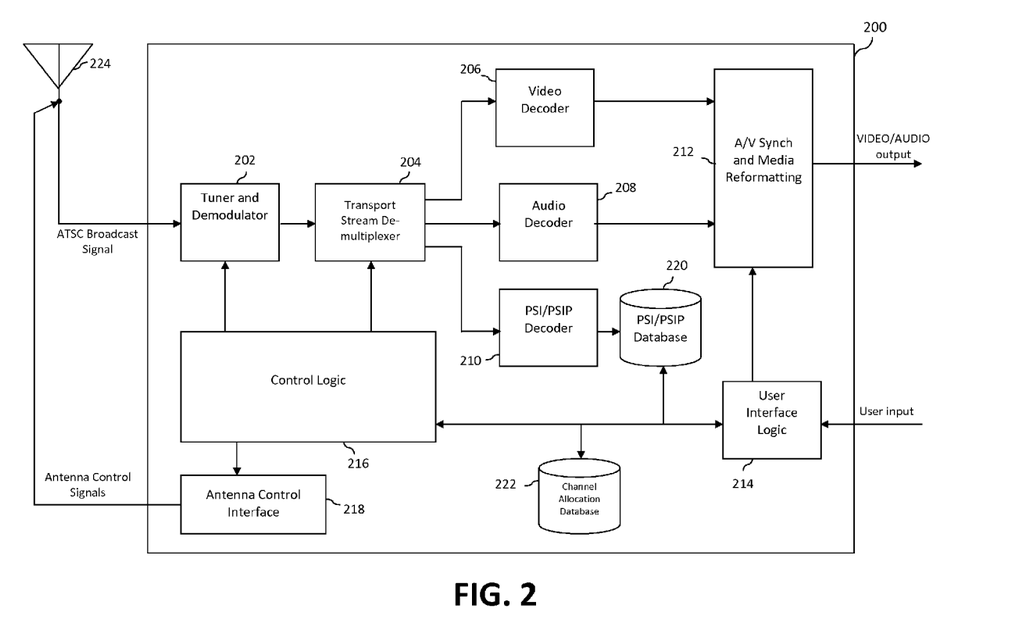
FIG. 2 is a block diagram of an example DTV receiver that implements the present invention.

B. Example DTV Receiver in Accordance with an Embodiment of the Present Invention FIG. 2 illustrates an example DTV receiver 200 that implements the present invention. DTV receiver 200 is described herein by way of example only and is not intended to limit the present invention. Persons skilled in the relevant art(s) will readily appreciate that the present invention may be implemented in other types of DTV receivers, or in other devices or systems entirely.

Example DTV receiver 200 includes a number of processing blocks that are described herein in terms of the signals that they receive and transmit as well as in terms of their function. It is to be understood that each of these processing blocks may be implemented in hardware using analog and/or digital circuits, in software, through the execution of instructions by one or more general purpose or special-purpose processors, or as a combination of hardware and software. In one embodiment, DTV receiver 200 is implemented as an application-specific integrated circuit (ASIC) that includes circuit blocks for performing certain functions in hardware, as well as a microprocessor subsystem block for performing other functions in software. Communication between the various processing blocks is by way of one or more busses internal to the ASIC. However, this implementation is described by way of example only and is not intended to limit the present invention.

As shown in FIG. 2, example DTV receiver 200 is connected to an antenna 224, which operates to wirelessly receive an off-air DTV broadcast signal and provide it to a tuner and demodulator 202 within DTV receiver 200. In one embodiment, antenna 224 is a smart antenna that is compliant with the Consumer Electronics Association (CEA) Antenna Control Interface Standard (EIA/CEA-909). As will be discussed in more detail herein, configuration of antenna 224 is controlled by control logic 216 within DTV receiver 200, which sends configuration commands to antenna 224 via an antenna control interface 218.

The tuner portion of tuner and demodulator 202 within DTV receiver 200 receives the ATSC broadcast signal from antenna 224 and converts it from an analog signal to a digital signal. Tuning is performed under the control of control logic 216. The demodulator portion of tuner and demodulator 202 demodulates the digital signal. In one embodiment, the demodulator portion of tuner and demodulator 202 is an 8-VSB demodulator.

Transport stream de-multiplexer 204 is connected to tuner and demodulator 202 and receives a demodulated signal therefrom. Transport stream de-multiplexer 204 selectively extracts single program transport streams from the demodulated signal as well as PSI/PSIP information embedded within the demodulated signal. Transport stream de-multiplexer 204 extracts this information under the control of control logic 216.

Once transport stream de-multiplexer 204 has selected a single program transport stream within the demodulated signal, it provides an MPEG-2 encoded video stream associated with the selected program to video decoder 206, which decodes the video signal and outputs the decoded video signal to audio/visual (A/V) synchronization and media reformatting block 212. Transport stream de-multiplexer 204 also provides an AC-3 encoded audio stream associated with the selected program to audio decoder 208, which decodes the audio signal and outputs the decoded audio signal to A/V synchronization and media reformatting block 212.

A/V synchronization and media reformatting block 212 performs functions to synchronize the video and audio content and to convert the content into a format suitable for display by a television or other media playing device or system. In one embodiment, A/V synchronization and media reformatting block 212 performs functions necessary to convert the video content into a format suitable for display by a digital television. In an alternate embodiment, A/V synchronization and media reformatting block 212 performs functions necessary to convert the video content into a format suitable for display by an analog television.

As noted above, transport stream de-multiplexer 204 extracts PSI and PSIP information from the demodulated signal provided by ATSC tuner and demodulator 202. This PSI and PSIP information is output to a PSI/PSIP decoder 210, which parses the information and stores it as PSI and PSIP tables in a PSI/PSIP database 220. These tables are then accessible to control logic 216 and user interface logic 214. Control logic 216 uses information from the PSI and PSIP tables to control the tuner within tuner and demodulator 202 to receive broadcast signals from a particular DTV station. Control logic 216 also uses information from the tables to control transport stream de-multiplexer 204 to select a particular program for decoding and display.

In the embodiment shown in FIG. 2, PSI/PSIP database 220 is located in a memory internal to DTV receiver 200. This memory preferably comprises a read-write memory, such as any type of random access memory (RAM). In an alternate embodiment, PSI/PSIP database 220 is stored in a memory device that is external to DTV receiver 200 and connected thereto via an appropriate interface.

As shown in FIG. 2, DTV receiver 200 further includes user interface logic 214. Among other functions, user interface logic 214 receives input signals originating from a user that indicate which channel the user wishes to tune to and which programs the user wishes to watch and passes such information to control logic 216. User interface logic also uses information stored in PSI/PSIP database 220 to generate information to be displayed to the user via the television screen. Such information may include the local time, the channel the user is watching, the broadcast entity associated with the channel, the name of a program that is currently airing or other information about the program, or a schedule of programs to be aired in the future (i.e., a program guide). Because such information is displayed on the television screen, it is provided to A/V synch and media reformatting block 212 where it replaces or is combined with the current video output signal.

C. Improved Channel Scan in Accordance with an Embodiment of the Present Invention Among other functions, DTV receiver 200 is configured to perform a channel scan of all available RF channels to attempt to lock on a useable broadcast signal for each channel. This channel scan is performed under the control of control logic 216 and may be performed as part of an automatic setup routine and/or in response to commands received from a user via user interface logic 214.

As will be discussed in more detail below, control logic 216 is configured to execute a channel scan in a manner that is faster and more efficient than that performed by conventional DTV receivers. In one embodiment of the present invention, control logic 216 accomplishes this by obtaining a Transport Stream Identifier (TSID) associated with a terrestrial broadcast digital signal. For example, this TSID may be obtained from a Terrestrial Virtual Channel Table (TVCT) or Program Allocation Table (PAT) stored in PSI/PSIP database 220.

Figure 3:
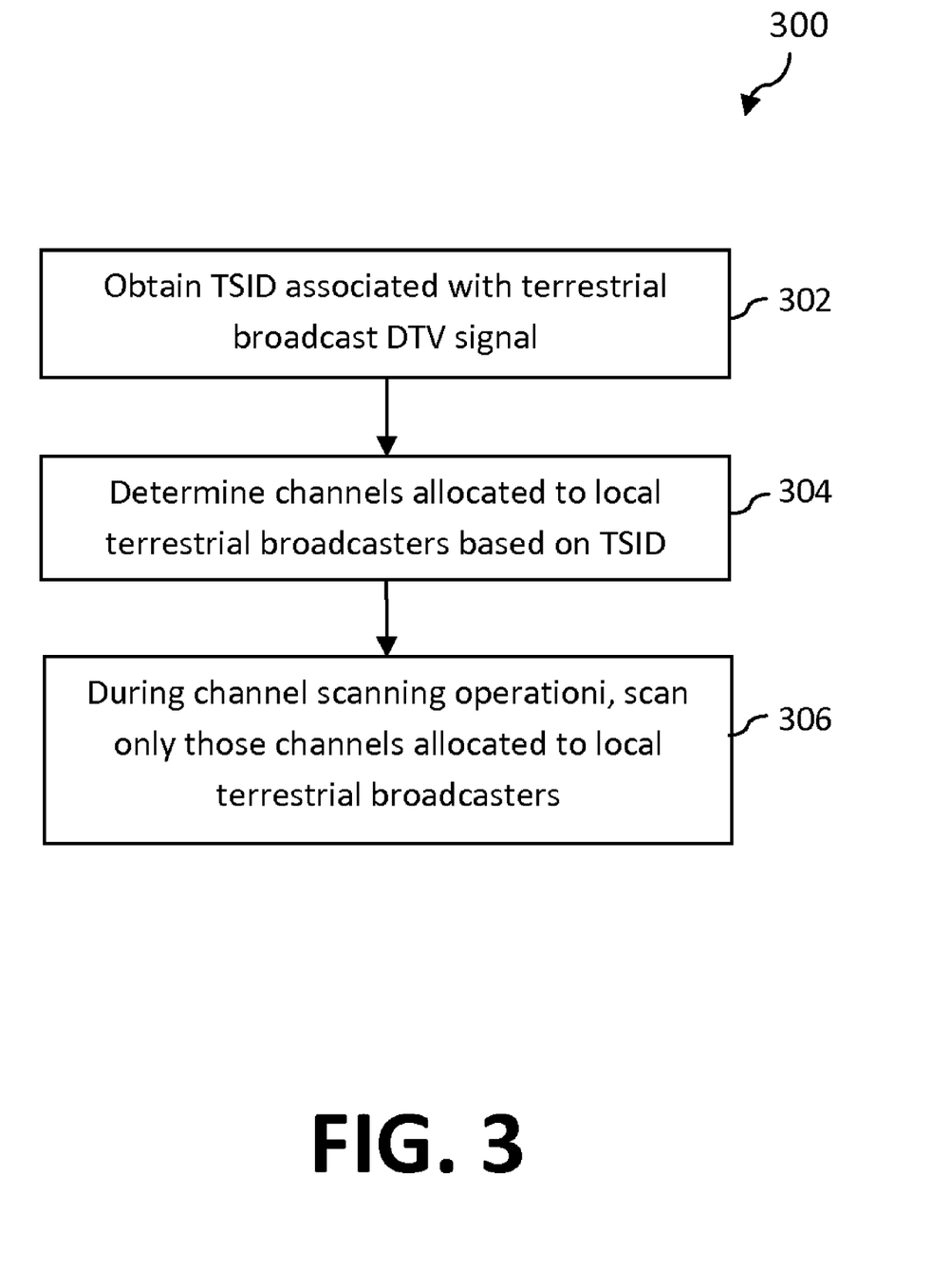
FIG. 3 depicts a flowchart of a general method for performing an improved channel scan by a terrestrial broadcast DTV receiver in accordance with an embodiment of the present invention.

Based on the TSID, control logic 216 then determines what other channels have been allocated to broadcasters in the same local terrestrial broadcast region as the terrestrial broadcaster associated with the TSID. Then, during the channel scanning operation, control logic 216 causes only those channels allocated to local terrestrial broadcasters to be scanned. This general approach is illustrated in flowchart 300 of FIG. 3.

To use the TSID to determine what other channels have been allocated to broadcasters in the same local terrestrial broadcast region, control logic 216 consults a channel allocation database 222 to which it is communicatively connected as shown in FIG. 2. Channel allocation database 222 associates TSIDs with both RF channels and geographic locations. As is known to persons skilled in the relevant art(s), a TSID is a unique 16-bit identifier that the FCC assigns to each terrestrial broadcaster. Since each terrestrial broadcaster is located in a fixed geographic location and is assigned a specific RF channel over which to broadcast, it is possible to create a database such as database 222 that associates a TSID with both the geographic location in which a broadcaster is located and the RF channel over which that broadcaster is transmitting.

Figure 4:
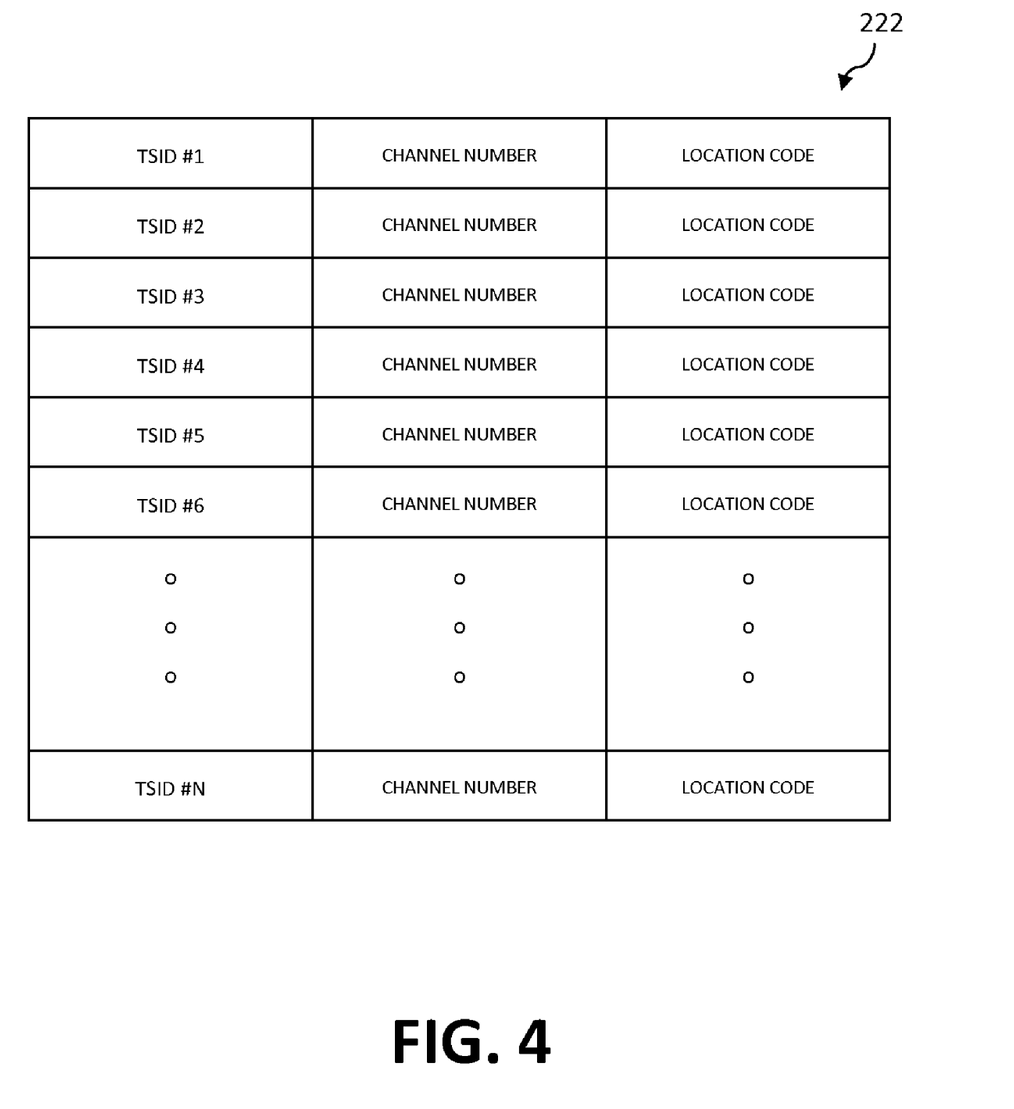
FIG. 4 illustrates a logical structure of a database that associates a TSID (Transport Stream Identifier or Transmission Stream Identifier) with a channel number and location code in accordance with an embodiment of the present invention.

An example of a logical structure of channel allocation database 222 is shown in FIG. 4. As shown in FIG. 4, the database includes a series of unique TSIDs (TSID # 1 through TSID # N). Associated with each TSID in the channel allocation database 222 of FIG. 4 is a channel number and a location code. The channel number and the location code are not unique fields. In other words, different TSIDs may be associated with the same channel numbers or the same location codes. The channel number is a number that identifies one of the different RF channels over which a DTV signal may be broadcast (e.g., channels 2-69). The location code is a numeric value intended to uniquely identify a geographic region in which a terrestrial broadcaster is located. In one embodiment of the present invention, the TSID is an unsigned 16-bit field, the channel number is an unsigned 8-bit field and the location code is an unsigned 10-bit field, although other formats may certainly be used.

In an embodiment of the present invention, channel allocation database 222 comprises a look-up table that is indexed by the unique TSID value associated with a local terrestrial broadcaster. Thus, the TSID can be directly mapped to the channel number and location code associated with the TSID. However, any of a wide number of known data structures and/or database types may be used to associate a TSID with a channel number and location code in accordance with the present invention and the invention is not limited to the use of a look-up table.

As shown in FIG. 2, channel allocation database 222 is stored in a memory that is internal to DTV receiver 200. Because it is not anticipated that the TSID to channel number and location code mappings will change frequently over time, channel allocation database 222 is preferably provisioned into a non-volatile memory within DTV receiver 200 prior to making DTV receiver 200 available to a consumer. By storing these mappings in a non-volatile memory, there is no need to re-load the information into memory every time DTV receiver 200 is powered on. The non-volatile memory may be, for example, an electrically erasable programmable read only memory (EEPROM) or a flash memory, although these examples are not intended to be limiting. Because EEPROMs and flash memories are re-programmable, the use of such technology makes it possible to update channel allocation database 222 even after DTV receiver 200 has been distributed to a consumer. However, as noted above, the mappings change infrequently and thus this may not be necessary.

In alternate embodiments of the present invention, channel allocation database 222 is stored in other types of memory within DTV receiver 200, including but not limited to any type of RAM or ROM. In still alternate embodiments of the present invention, channel allocation database 222 is stored in a memory device that is external to DTV receiver 200 and connected thereto via an appropriate interface.

Figure 5:
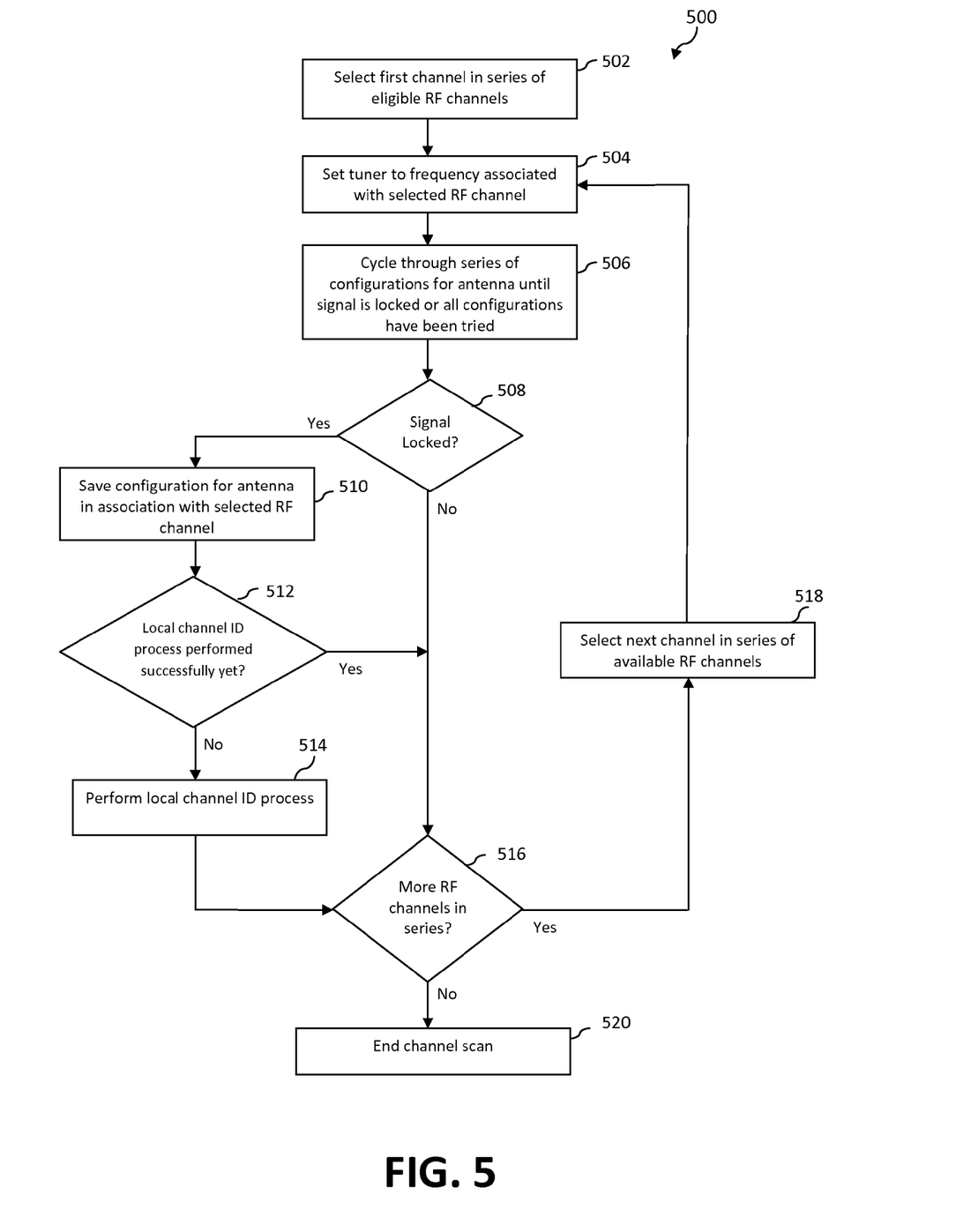
FIG. 5 depicts a flowchart of a method for performing an improved channel scan by a terrestrial broadcast DTV receiver in accordance with an embodiment of the present invention.

D. Example Method for Improved Channel Scan in Accordance with an Embodiment of the Present Invention FIG. 5 depicts a flowchart 500 of an exemplary method for performing an improved channel scan in accordance with an embodiment of the present invention. The method of flowchart 500 will be described with continued reference to DTV receiver 200 of FIG. 2, although the invention is not limited to that embodiment.

As shown in FIG. 5, the method begins at step 502, in which control logic 216 selects a first channel in a series of RF channels that are eligible for scanning. For example, in one embodiment of the present invention, the series of eligible RF channels consists of channels 2 through 69, with the first channel in the series being channel 2, the next channel in the series being channel 3, and so forth and so on up to channel 69. However, the present invention is not limited to this embodiment, and the series of eligible RF channels may include other RF channels or channel sequences.

At step 504, control logic 216 controls the tuner within tuner and demodulator 202 to tune to a frequency associated with the RF channel selected in step 502.

At step 506, control logic 216 then cycles through a series of configurations for antenna 224 until the tuner within tuner and demodulator 202 is able to lock on a broadcast signal at the selected RF channel frequency or until all antenna configurations have been attempted. As discussed above in reference to FIG. 2, control logic 216 controls the configuration of antenna 224 by sending configuration commands to antenna 224 via antenna control interface 218. In one embodiment in which antenna 224 is a smart antenna that is compliant with the Consumer Electronics Association (CEA) Antenna Control Interface Standard (EIA/CEA-909), each configuration command contains 7 bits of configuration data—2 bits for coarse direction or switching control, 2 bits for fine direction control, 1 bit for polarization control and 2 bits for controlling preamplifier gain. This results in 128 different antenna configurations. Thus, in such an embodiment, step 506 may involve cycling through up to 128 different configurations for antenna 224. Further information concerning the EIA/CEA-909 configuration parameters may be found in the EIA/CEA-909 standard, the entirety of which is incorporated by reference herein.

At decision step 508, control logic 216 determines whether or not the tuner within tuner and demodulator 202 was able to lock on a broadcast signal at the selected RF channel frequency using any of the available antenna configurations. If the tuner was unable to lock on a broadcast signal, then the channel scan for the selected channel has failed. Processing then proceeds to decision step 516, in which control logic 216 determines whether or not there are any more RF channels in the series of RF channels eligible for scanning. If there are, then control logic 216 selects the next channel in the series as shown at step 518 and processing returns to step 504. If there are not, then the channel scan ends at step 520.

If, however, control logic 216 determines at decision step 508 that the tuner within tuner and demodulator 202 was able to lock on a broadcast signal at the selected channel frequency, then processing proceeds to step 510. At step 510, control logic 216 saves the particular antenna configuration parameters that were used to successfully lock on the broadcast signal in association with the selected RF channel. This saved information can then be accessed at a later time by control logic 216 and used to configure antenna 224 for reception of the selected RF channel. In an embodiment, the saved antenna configuration parameters include the seven EIA/CEA-909 control bits discussed above in reference to step 506, although the invention is not so limited.

After step 510, processing proceeds to decision step 512, in which control logic 216 determines whether or not a local channel identification (ID) process (to be described later herein) has been successfully performed. If the local channel ID process has been successfully performed, then processing proceeds to decision step 516, in which control logic 216 determines whether or not there are any more RF channels in the series of RF channels eligible for scanning. If there are, then control logic 216 selects the next channel in the series as shown at step 518 and processing returns to step 504. If there are not, then the channel scan ends at step 520.

If, however, it is determined at decision step 512 that the local channel ID process has not yet been successfully performed, then the local channel ID process is performed as shown at step 514. As will be described in more detail below, successful performance of the local channel ID process may result in the elimination of one or more RF channels from the series of RF channels eligible for scanning, thus resulting in a reduction of the remaining number of RF channels to be scanned. This has the effect of reducing the overall time that it takes for DTV receiver 200 to perform a channel scan. After the local channel ID process is performed at step 514, processing then proceeds to decision step 516, in which control logic 216 determines whether or not there are any more RF channels in the series of RF channels eligible for scanning. If there are, then control logic 216 selects the next channel in the series as shown at step 518 and processing returns to step 504. If there are not, then the channel scan ends at step 520.

Figure 6:
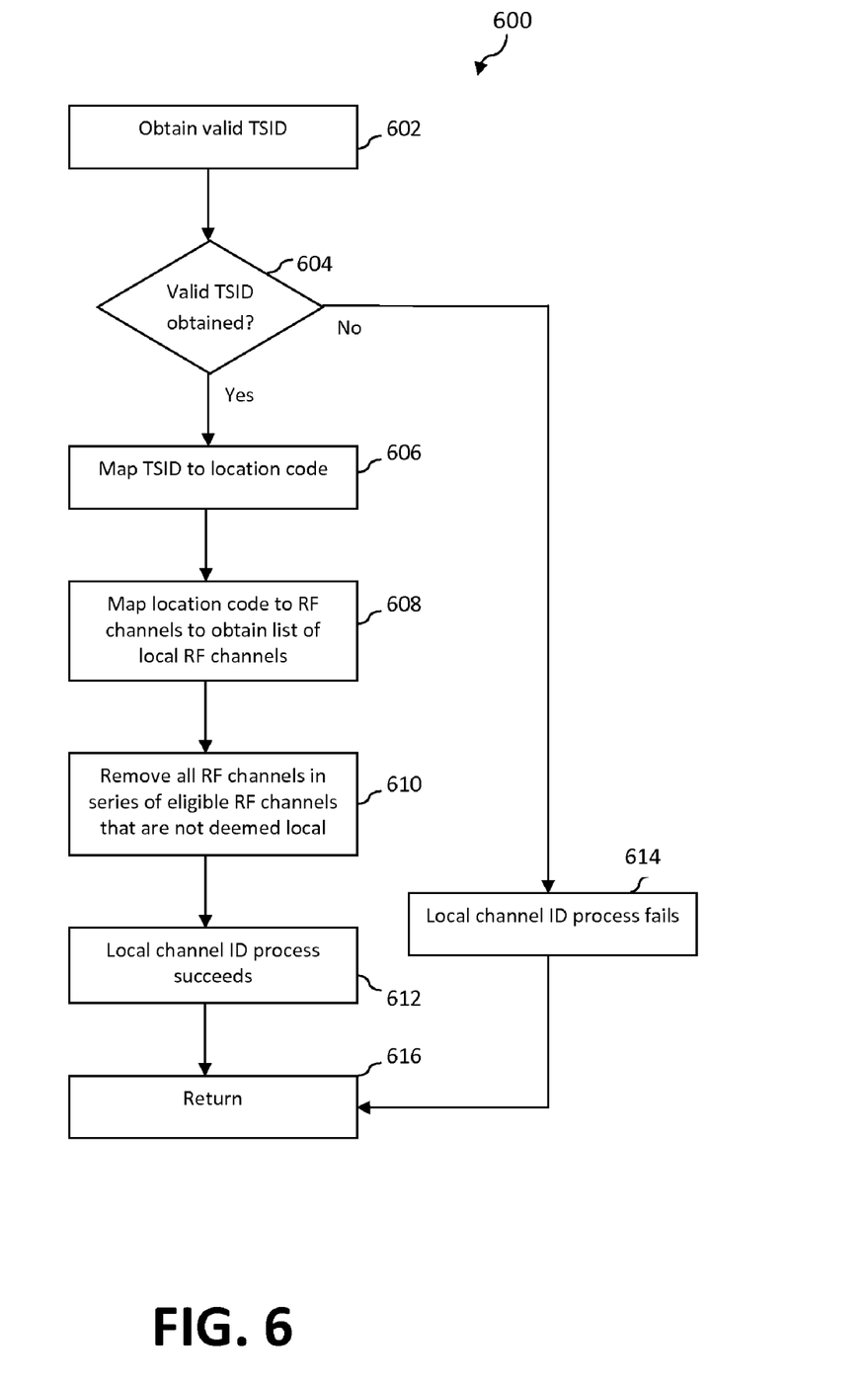
FIG. 6 depicts a flowchart of a method for performing a channel identification process in accordance with an embodiment of the present invention.

FIG. 6 depicts a flowchart 600 of an example method for performing the local channel ID process discussed above in reference to step 514 of FIG. 5. The purpose of the local channel ID process is to identify which of the RF channels eligible for scanning are carrying broadcast signals in the local terrestrial broadcast region. Any channels not so identified are then removed from the series of RF channels eligible for scanning. As noted above, this has the effect of reducing the overall time that it takes for DTV receiver 200 to perform a channel scan.

The method of flowchart 600 will now be described with continued reference to DTV receiver 200 of FIG. 2, although the invention is not limited to that embodiment.

The method of flowchart 600 begins at step 602, in which control logic 216 attempts to obtain a valid TSID associated with an RF channel that was locked onto during step 506 of flowchart 500. In one embodiment, control logic 216 attempts to obtain a valid TSID associated with the RF channel from a Terrestrial Virtual Channel Table (TVCT) stored in PSI/PSIP database 220. In an alternate embodiment, control logic 214 attempts to obtain a valid TSID associated with the RF channel from a Program Association Table (PAT) stored in PSI/PSIP database 220.

At decision step 604, control logic 216 determines whether or not a valid TSID has been obtained during step 602. If a valid TSID has not been obtained, then the local channel ID process is deemed to have failed as shown at step 614 and control returns to the appropriate step within flowchart 500 as shown at step 616.

However, if it is determined at decision step 604 that a valid TSID has been obtained, then processing proceeds to step 606. At step 606, control logic 216 accesses channel allocation database 222 and obtains the location code that is associated with the valid TSID in the database. The location code uniquely identifies the local terrestrial broadcast region within which the broadcaster associated with the TSID (and therefore, presumably, DTV receiver 200) is located. As noted above, the TSID may be used as an index to a look-up table that stores channel numbers and location codes. However, alternative methods for linking or mapping a TSID to channel numbers and location codes may be used.

At step 608, control logic 216 again accesses channel allocation database 222 and reverse maps the location code obtained in step 606 to all channel numbers associated with that particular location code. Since each of these channel numbers is associated with the same location code, they represent RF channels that carry DTV broadcast signals within the same local terrestrial broadcast region.

At step 610, control logic 216 removes from the series of RF channels available for scanning all RF channels that were not identified as local RF channels at step 608. Since these channels are not being used within the local terrestrial broadcast region to carry a DTV broadcast signal, they need not be scanned. After step 610, the local channel ID process is deemed to have succeeded as shown at step 612 and control returns to the appropriate step within flowchart 500 as shown at step 616.

Figure 7:
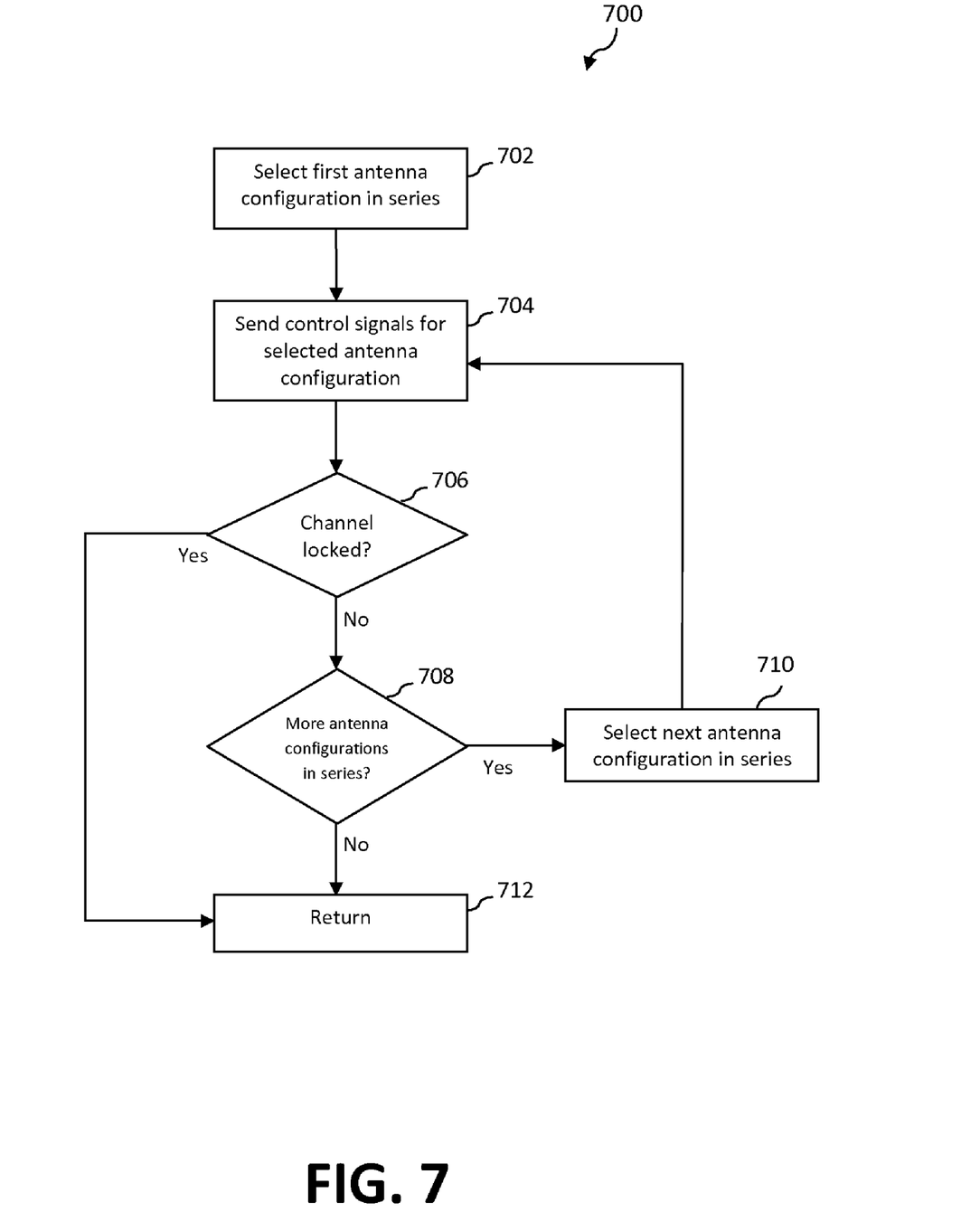
FIG. 7 depicts a flowchart of a method for modifying the configuration of an antenna during a channel scan operation in accordance with an embodiment of the present invention.

E. Re-Use of Antenna Configuration Parameters in Accordance with an Embodiment of the Present Invention FIG. 7 depicts a flowchart 700 of an example method for performing step 506 of flowchart 500. As discussed above, during step 506, control logic 216 cycles through a series of configurations for antenna 224 until the tuner within tuner and demodulator 202 is able to lock on a broadcast signal at the selected RF channel frequency or until all antenna configurations have been attempted. The method of flowchart 700 will now be described with continued reference to DTV receiver 200 of FIG. 2, although the invention is not limited to that embodiment.

The method of flowchart 700 begins at step 702, in which control logic 216 selects a first antenna configuration from a series of antenna configurations. As discussed above, in an embodiment in which antenna 224 is a smart antenna designed in compliance with EIA/CEA-909, the series of antenna configurations may correspond to the 128 different permutations of the 7 control bits available under Mode A operation as described in that standard.

At step 704, control logic 216 sends control signals for the selected antenna configuration to antenna 224 via antenna control interface 218. At decision step 706, control logic 216 determines whether or not the tuner within tuner and demodulator 202 has been able to lock on a broadcast signal using the current antenna configuration. If the tuner has been able to lock on a broadcast signal, then the method is complete and control returns to the appropriate step within flowchart 500 as shown at step 712.

If however the tuner has not been able to lock on a broadcast signal, then control logic 216 determines if there are more antenna configurations in the series of antenna configurations that have not yet been tried as shown at decision step 708. If there are more antenna configurations in the series that have not yet been tried, then the next antenna configuration in the series is selected as shown at step 710 and processing returns to step 704. If, on the other hand, all the antenna configurations in the series have been tried, then the method is complete and control returns to the appropriate step within flowchart 500 as shown at step 712.

A more efficient method of performing the foregoing method that re-uses antenna configuration parameters will now be described. This method relies on the addition of another field of information to channel allocation database 222, original described above in reference to DTV receiver 200 of FIG. 2.

Figure 8:
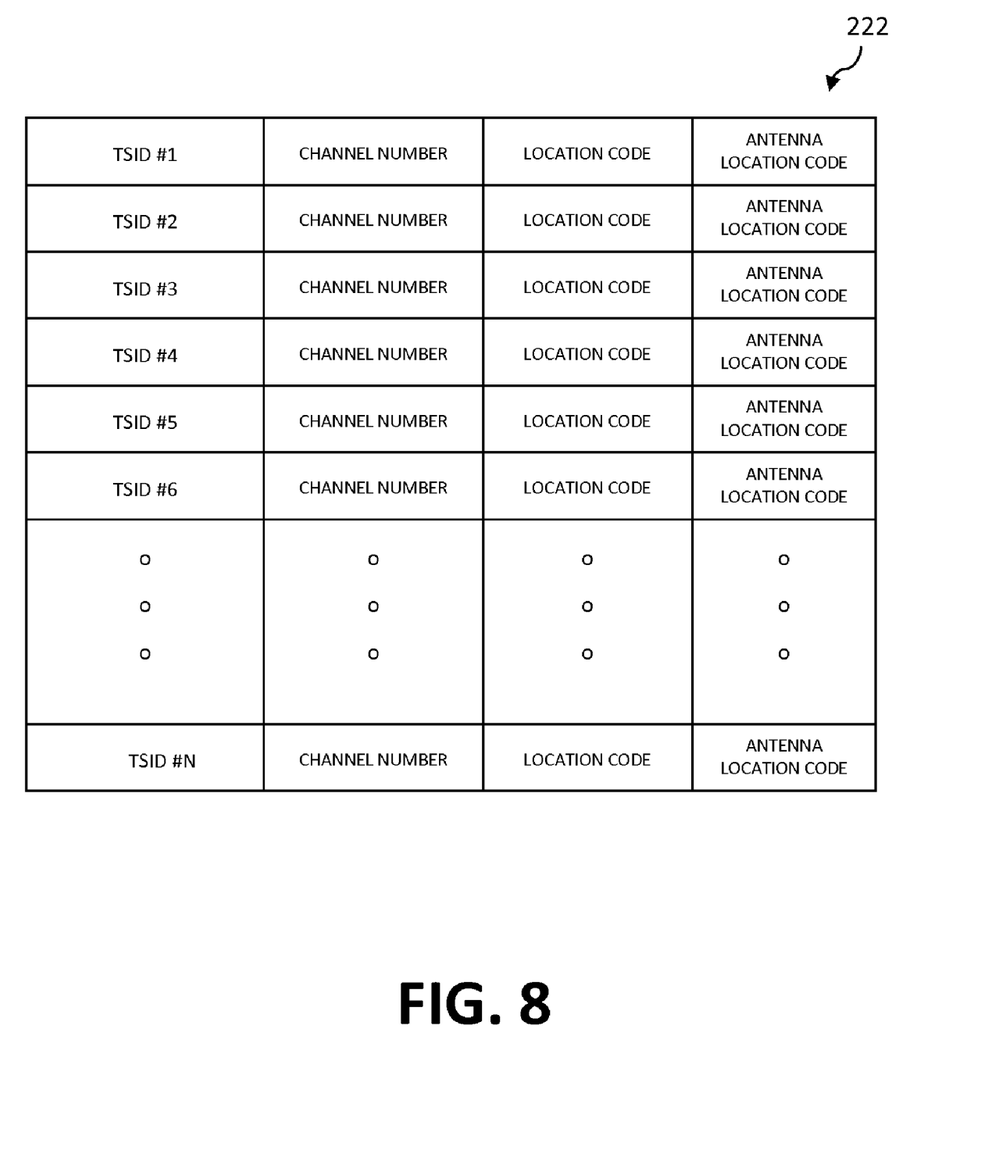
FIG. 8 illustrates a logical structure of a database that associates a TSID (Transport Stream Identifier or Transmission Stream Identifier) with a channel number, a location code, and an antenna location code in accordance with an embodiment of the present invention.

FIG. 8 illustrates an example logical structure of a channel allocation database 222 that includes the additional field. As shown in FIG. 8, the database includes a series of unique TSIDs (TSID # 1 through TSID # N). Associated with each TSID in the channel allocation database 222 of FIG. 8 is a channel number and a location code. These fields have already been described herein. However, also associated with each TSID in channel allocation database 222 is an antenna location code. The antenna location code is a numeric value intended to uniquely identify the location of a broadcast antenna or tower within a given local terrestrial broadcast region. The antenna location code is not a unique field. In other words, different TSIDs may be associated with the same antenna location codes. In an embodiment of the present invention, the antenna location code is an unsigned 5-bit field, although other formats may certainly be used.

Figure 9:
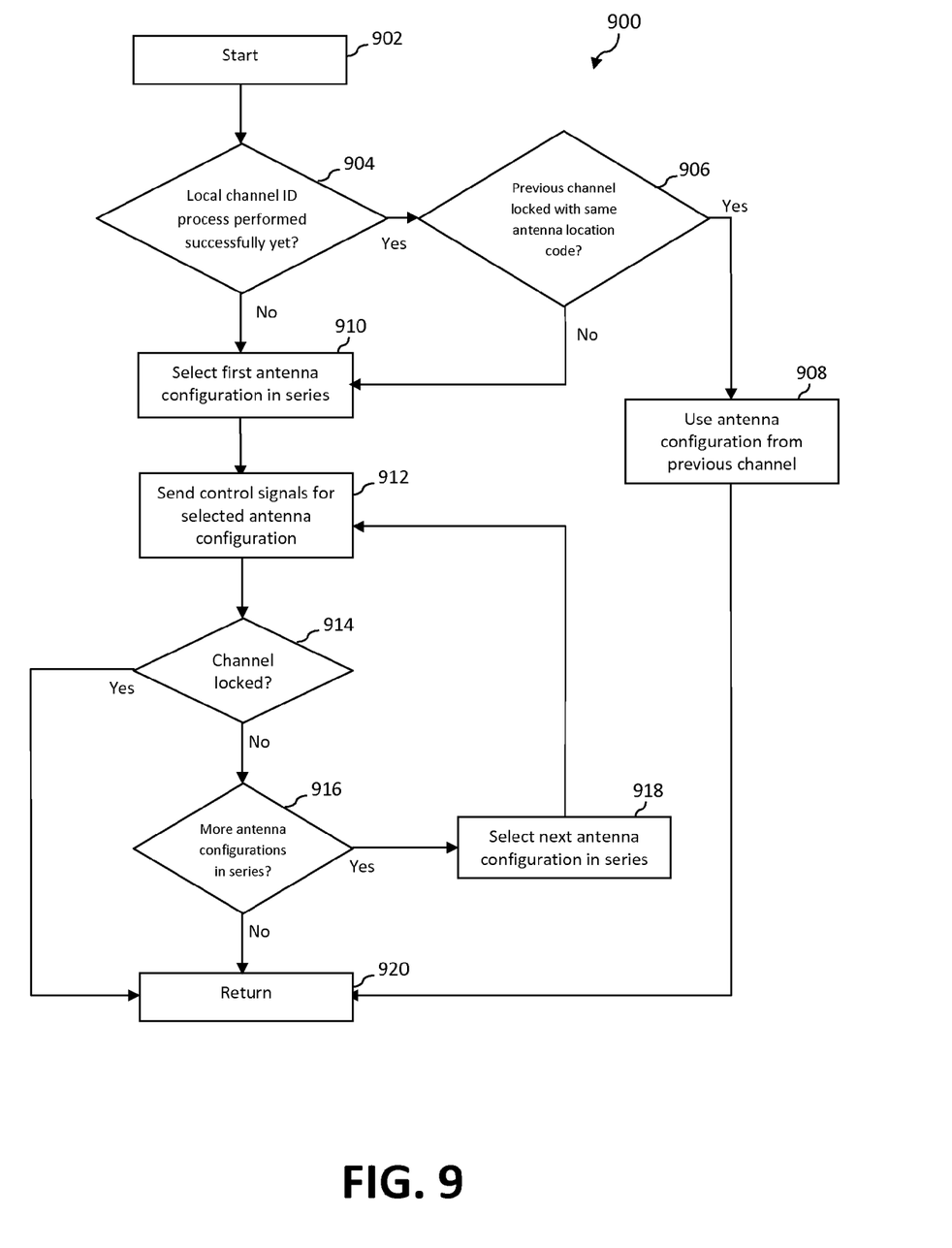
FIG. 9 depicts a flowchart of a method for modifying the configuration of an antenna during a channel scan operation that re-uses antenna configuration parameters in accordance with an embodiment of the present invention.

The more efficient method will now be described with reference to flowchart 900 of FIG. 9. As shown in that figure, the method of flowchart 900 begins at step 902. Processing then immediately proceeds to decision step 904, in which control logic 216 determines if a local channel ID process has been performed successfully yet. As discussed above, the local channel ID process is the process by which local broadcast channels are identified and it is used to limit the number of channels over which a channel scan is performed. If control logic 216 determines that the local channel ID process has not yet been performed successfully, then processing proceeds to step 910, in which a first antenna configuration in a series of antenna configurations is selected. The processing from this point forward is essentially identical to that described above in reference to flowchart 700 of FIG. 7 and therefore will not be further for the sake of brevity.

If, on the other hand, if it is determined at decision step 904 that the local channel ID process has been performed successfully, then processing proceeds to decision step 906. As discussed above, if the local channel ID process has been successfully performed, then control logic 216 has accessed channel allocation database 222 and identified a location code that is commonly associated with all the RF channels that remain eligible for scanning. However, in accordance with this alternate embodiment of the present invention, control logic 216 also accesses an antenna location code associated with each of the eligible RF channels in database 222.

At decision step 906, control logic 216 determines whether any previously-scanned RF channel for which a broadcast signal has been locked has the same antenna location code as the RF channel that is currently being scanned. If so, then control logic 216 uses the antenna configuration for the previously-scanned RF channel as the antenna configuration for the current RF channel, as shown at step 908. Since control logic 216 has already determined the optimal antenna configuration for receiving a broadcast signal from that particular broadcast transmitter or tower, there is no need to cycle through all the possible antenna configurations to determine the optimal configuration for the current RF channel. This has the beneficial effect of reducing the number of antenna configuration commands that must be transmitted by DTV receiver 200 and processed by antenna 224. This in turn reduces the overall amount of time necessary for DTV receiver 200 to perform a channel scan. After step 908, processing returns to the appropriate step within flowchart 500 of FIG. 5 as shown at step 920.

If however at decision step 906 it is determined that no previously-scanned RF channel for which a broadcast signal has been locked has the same antenna location code as the RF channel that is currently being scanned, then processing proceeds to step 910, in which a first antenna configuration in a series of antenna configurations is selected. The processing from this point forward is essentially identical to that described above in reference to flowchart 700 of FIG. 7 and therefore will not be further for the sake of brevity.

F. Alternative Methods for Obtaining a TSID in Accordance with Embodiments of the Present Invention As noted above, in one embodiment of the present invention, a Transport Stream ID (TSID) that uniquely identifies a terrestrial broadcaster is obtained from the PSIP TVCT stored within PSI/PSIP database 220. However, in alternate embodiments of the present invention, an analog Transmission Signal ID (the acronym is also TSID) that also uniquely identifies the terrestrial broadcaster may be obtained from the ATSC-compliant broadcast signal. In particular, this analog TSID may be obtained from an EIA/CEA-608-B data stream embedded within an ATSC MPEG-2 video elementary transport stream. EIA/CEA-608-B is an industry standard published by the Electronics Industry Alliance for using or providing Closed Captioning services or other data services embedded in line 21 of the Vertical Blanking Interval of an NTSC video signal. This standard is incorporated by reference in its entirety herein.

The analog TSID may be obtained instead of, or in addition to, the TSID obtained from the TVCT in PSI/PSIP database 220. For example, if control logic 216 is unable to obtain a valid TSID from PSI/PSIP database 220, it may attempt to obtain the analog TSID from the EIA/CEA-608-B data stream. Alternatively, control logic 216 may first attempt to obtain a valid analog TSID from the EIA/CEA-608-B data stream and, if it cannot do so, then obtain the TSID from the TVCT in PSI/PSIP database 220. In a further alternate embodiment, even if a valid TSID is obtained from PSI/PSIP database 220, control logic 216 may use the analog TSID obtained from the EIA/CEA-608-B data stream to verify that the TSID obtained from PSI/PSIP database 220 is valid, or vice versa.

G. Conclusion

While various embodiments of the present invention have been described above, it should be understood that they have been presented by way of example only, and not limitation. For example, while the foregoing text related to FIGS. 2, 5, 7 and 9 of the present application describe embodiments that include functionality for controlling an antenna, such as a smart antenna designed to comply with EIA/CEA 909, the invention is not limited to those embodiments. Indeed, the present invention may be used in any device or system that performs a channel scan in order to receive one or more terrestrial broadcast DTV signals.

It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for performing a channel scan by a digital television (DTV) receiver, comprising:
   obtaining a Transport Stream ID of a terrestrial broadcast signal from a Terrestrial Virtual Channel Table associated with the terrestrial broadcast signal, wherein the Transport Stream ID is transmitted as part of the terrestrial broadcast signal and the terrestrial broadcast signal is a digital television signal;
   accessing a memory to identify one or more local radio frequency (RF) channels based on the Transport Stream ID; and
   removing from a series of RF channels that are eligible for channel scanning any RF channel that is not identified as a local RF channel during the accessing step,
   wherein accessing the memory to identify the one or more local RF channels based on the Transport Stream ID comprises:
      performing a first memory access to obtain a location code associated with the Transport Stream ID; and
      performing a second memory access to obtain one or more channel numbers associated with the obtained location code, wherein each channel number uniquely identifies a local RF channel.

2. A method for performing a channel scan by a digital television (DTV) receiver, comprising:
   obtaining a unique identifier of a terrestrial broadcast signal, wherein the terrestrial broadcast signal is an Advanced Television Systems Committee (ATSC)-compliant broadcast signal for receiving a digital television signal and obtaining the unique identifier of the terrestrial broadcast signal comprises obtaining a Transmission Signal ID associated with the terrestrial broadcast signal from an EIA/CEA-608-B data stream embedded within the terrestrial broadcast signal;
   accessing a memory to identify one or more local radio frequency (RF) channels based on the unique identifier; and
   removing from a series of RF channels that are eligible for channel scanning any RF channel that is not identified as a local RF channel during the accessing step,
   wherein accessing the memory to identify the one or more local RF channels based on the unique identifier comprises:
      performing a first memory access to obtain a location code associated with the Transmission Signal ID; and
      performing a second memory access to obtain one or more channel numbers associated with the obtained location code, wherein each channel number uniquely identifies a local RF channel.

3. The method of claim 1, wherein performing the second memory access further comprises identifying a broadcast antenna location associated with each local RF channel, and wherein the method further comprises:
   storing a set of parameters for configuring an antenna connected to the DTV receiver to receive a signal broadcast over a first local RF channel; and
   using the stored set of parameters for configuring the antenna to receive a signal broadcast over a second local RF channel if the broadcast antenna location associated with the first local RF channel is the same as the broadcast antenna location associated with the second local RF channel.

4. A digital television (DTV) receiver, comprising:
   a memory; and
   control logic adapted to obtain, from a terrestrial broadcast signal received by the DTV receiver, a Transport Stream ID of the terrestrial broadcast signal from a Terrestrial Virtual Channel Table transmitted as part of the terrestrial broadcast signal, to access the memory to identify one or more local radio frequency (RF) channels based on the Transport Stream ID, and to remove from a series of RF channels that are eligible for channel scanning any RF channel that is not identified as a local RF channel,
   wherein the control logic is further adapted to perform a first memory access to obtain a location code associated with the Transport Stream ID and to perform a second memory access to obtain one or more channel numbers associated with the obtained location code, wherein each channel number uniquely identifies a local RF channel.

5. A digital television (DTV) receiver, comprising:
   a memory; and
   control logic adapted to obtain a unique identifier of a terrestrial broadcast signal received by the DTV receiver, wherein the terrestrial broadcast signal is an Advanced Television Systems Committee (ATSC)-compliant broadcast signal for receiving a digital television signal and obtaining the unique identifier comprises obtaining a Transmission Stream ID associated with the terrestrial broadcast signal from an EIA/CEA-608-B data stream embedded within the terrestrial broadcast signal, to access the memory to identify one or more local radio frequency (RF) channels based on the unique identifier, and to remove from a series of RF channels that are eligible for channel scanning any RF channel that is not identified as a local RF channel,
   wherein the control logic is further adapted to perform a first memory access to obtain a location code associated with the unique identifier and to perform a second memory access to obtain one or more channel numbers associated with the obtained location code, wherein each channel number uniquely identifies a local RF channel.

6. The DTV receiver of claim 4, wherein the control logic is further adapted to identify a broadcast antenna location associated with each local RF channel during the second memory access, to store a set of parameters for configuring an antenna connected to the DTV receiver to receive a signal broadcast over a first local RF channel, and to use the stored set of parameters for configuring the antenna connected to the DTV receiver to receive a signal broadcast over a second local RF channel if the broadcast antenna location associated with the first local RF channel is the same as the broadcast antenna location associated with the second local RF channel.

7. A system for receiving a digital television (DTV) signal, comprising:
   a DTV receiver; and
   an antenna communicatively coupled to the DTV receiver, the antenna adapted to receive a plurality of configuration commands from the DTV receiver, wherein each of the plurality of configuration commands causes the antenna to operate in a corresponding one of a plurality of different operating modes;
   wherein the DTV receiver is adapted to store a configuration command used to control the antenna to receive a first DTV signal broadcast over a first radio frequency (RF) channel and to determine an antenna location code associated with the first DTV signal that identifies a location of an antenna from which the first DTV signal is broadcast, and
   wherein the DTV receiver is further adapted to determine an antenna location code associated with a second DTV signal broadcast over a second RF channel that identifies a location of an antenna from which the second DTV signal is broadcast, and to use the stored configuration command to control the antenna to receive the second DTV signal broadcast over the second RF channel when the DTV receiver determines that the antenna location code associated with the first DTV signal and the antenna location code associated with the second DTV signal are the same.

8. The system of claim 7, wherein each configuration command includes a parameter for controlling antenna direction.

9. The system of claim 7, wherein each configuration command includes a parameter for controlling antenna polarization.

10. The system of claim 7, wherein each configuration command includes a parameter for controlling antenna preamplifier gain.

11. The system of claim 7, wherein the antenna is compliant with the Consumer Electronics Association (CEA) Antenna Control Interface Standard (EIA/CEA-909).

12. The method of claim 1, wherein the location code is stored in association with the Transport Stream ID in a channel allocation database.

13. The method of claim 12, wherein the channel allocation database is stored in a non-volatile memory of the DTV receiver.

14. The method of claim 2, wherein the location code is stored in association with the unique identifier in a channel allocation database.

15. The method of claim 14, wherein the channel allocation database is stored in a non-volatile memory of the DTV receiver.

16. The method of claim 3, further comprising:
storing a set of parameters for configuring the antenna connected to the DTV receiver to receive a signal broadcast over each of a plurality of local RF channels;
comparing a broadcast antenna location of an RF channel for which the antenna is currently being configured to receive a signal broadcast thereover with broadcast antenna location codes associated with the plurality of local RF channels; and
using a set of parameters associated with at least one of the plurality of local RF channels having a same broadcast antenna location as the RF channel for which the antenna is currently being configured to configure the antenna to receive the signal broadcast thereover.

17. The DTV receiver of claim 4, wherein the location code is stored in association with the Transport Stream ID in a channel allocation database.

18. The DTV receiver of claim 17, wherein the channel allocation database is stored in a non-volatile memory of the DTV receiver.

19. The DTV receiver of claim 5, wherein the location code is stored in association with the unique identifier in a channel allocation database.

20. The DTV receiver of claim 19, wherein the channel allocation database is stored in a non-volatile memory of the DTV receiver.

* * * * *